Patented Oct. 14, 1952

2,614,105

UNITED STATES PATENT OFFICE 2,614,105

PREPARATION OF 8-CHLORO-THEOPHYLLINE

August H. Homeyer, Webster Groves, and George B. De La Mater, St. Louis, Mo., assignors to Mallinckrodt Chemical Works, St. Louis, Mo., a corporation of Missouri No Drawing. Application May 23, 1949, Serial No. 94,937

14 Claims. (Cl. 260—254)

This invention relates to halogenation and more particularly to the direct chlorination of theophylline.

Briefly this invention relates to methods for directly chlorinating theophylline in the 8-position which comprises the gradual addition of an approximately equimolecular quantity of chlorine to theophylline, the reaction being carried out preferably in a reaction medium of a substantially anhydrous and inert liquid.

Among the objects of this invention is the provision of methods for obtaining 8-chlorotheophylline by direct chlorination of theophylline itself. Other features will be in part apparent and in part pointed out hereinafter.

The invention accordingly comprises the steps and sequence of steps, and features of manipulation, which will be exemplified in the methods hereinafter described, and the scope of the application of which will be indicated in the following claims.

In the past, 8-chlorotheophylline, a valuable intermediate for the manufacture of pharmaceuticals, has been obtained by chlorinating caffeine followed by hydrolyzing the resulting 7′,8-dichlorocaffeine. An alternative method has been to heat 1,3-dimethyl uric acid with phosphorus oxychloride and phosphorus pentachloride in a sealed tube at a rather high temperature. Neither method gives 8-chlorotheophylline directly from a readily available starting material, and no such direct method has been known. For example, it has been shown by Blitz and Strufe (Annalen 404, 131–169 (1914) and 413, 159 (1917)) that chlorination of theophylline itself invariably results in attack of the 4,5-double bond giving chloro, hydroxy and alkoxy derivatives of no value, or causes fission of the purine system to give dimethyl alloxan. No 8-chlorotheophylline is formed.

In accordance with the present invention it has been found that under certain conditions chlorine will react at the 8-position on theophylline without attacking the 4,5-double bond. If not substantially more than an equimolecular quantity of chlorine is gradually added to a solution or suspension of theophylline at room or slightly elevated temperatures, the reaction proceeds smoothly and 8-chlorotheophylline is readily formed. Moreover it is easily recovered and purified.

The reaction can be carried out in an aqueous medium, but it has been found that the optimum yields are obtained when the reaction medium consists of a substantially anhydrous and inert liquid, preferably one that does not contain hydroxyl groups. It is not necessary for the reaction medium to be a good solvent for either theophylline or 8-chlorotheophylline.

It has also been found that better yields are obtained if the reaction mixture is substantially anhydrous, but it should be clearly understood that this is merely a preferred feature of the invention and not an essential requirement. Solvents can be suitably dried for this reaction by any of the conventional methods, for example, by adding thionyl chloride, sufficient to react with the water present, or by distilling off a portion of the liquid before the chlorine is added.

It is important that the reaction mixture should not contain a large excess of chlorine and the chlorine should not be added at a rate substantially faster than that at which it reacts with the theophylline. Some excess is of course unavoidable, but it is desirable that it should not be more than about 5% of the theoretical quantity required for the introduction of one atom of chlorine into each molecule of theophylline.

The following examples illustrate the invention.

Example 1

For the following reaction a 3-liter, 3-necked flask equipped with a stirrer, a thermometer and a tube that extended almost to the bottom of the flask was used. Anhydrous theophylline (108 g., 0.60 mole) was suspended in freshly distilled nitrobenzene (500 ml.) and thionyl chloride (5 g.) was added to remove any last traces of water. The mixture was warmed to 70° C. with stirring, the heating mantle was removed, and then chlorine gas was introduced through the tube at the rate of about 1 g. per minute. At the end of 25 minutes a total of 21 g. (0.3 mole) of chlorine had been introduced and the temperature of the mixture had risen to 80° C. Up to this point little evolution of gas was observed. On continued addition of chlorine, however, there was vigorous evolution of hydrogen chloride and the temperature began to fall. It was necessary to apply heat during the remainder of the reaction to prevent the temperature from going below 70° C.

After a total of 50 g. of chlorine was introduced (total time was 42 minutes), the addition of the gas was stopped. The presence of free chlorine in the mixture was indicated by the dark blue color produced when a drop of the mixture was placed on a strip of moistened starchiodide paper, so diisobutylene (25 ml.) was added. The reaction mixture immediately became a brilliant lavender pink, but the color soon faded to a light yellow. The mixture no longer contained free chlorine.

All of the solids were dissolved by adding 5% aqueous sodium hydroxide solution (600 ml.) and warming the mixture to 80° C. with stirring. The nitrobenzene layer was separated and extracted with 5% sodium hydroxide solution (100 ml). Nitrobenzene was removed from the combined aqueous extracts by steam distillation, then the remaining orange liquid was treated with decolorizing carbon (10 g.) and filtered. When the filtrate was acidified with dilute sulfuric acid, a cream-colored solid precipitated. It was filtered off, washed with water and dried. The dry solid weighed 97 g. (75% of theory) and melted at 297° C. with decomposition. The neutralization equivalent was 217. This product was 8-chlorotheophylline identical with that obtained by hydrolysis of 7',8-dichlorocaffeine.

*Example 2*

Anhydrous theophylline (108 g.) was suspended in distilled nitrobenzene (600 ml) and 50 ml. of the liquid was distilled from the flask under vacuum to remove all water. Dry air was admitted to the flask and the temperature was raised to 70° C. A total of 46 g. (0.66 mole) of chlorine was added to the stirred mixture over a period of 37 minutes while the temperature was kept between 70 and 78° C.

8-chlorotheophylline was recovered and purified as described in Example 1. The product weighed 95 g. (73.5% of theory).

*Example 3*

A mixture of 1,1,2,2-tetrachloroethane (300 ml.), anhydrous theophylline (54 g., 0.3 mole) and thionyl chloride (4 ml.) was heated to 70° C. and chlorine (23 g., 0.32 mole) was introduced at a uniform rate over a period of 35 minutes while the temperature was maintained at 70–78° C. After the addition of chlorine was complete, the mixture was stirred for five minutes. Diisobutylene (20 ml.) was added and the mixture was stirred for an additional ten minutes. After hot water (500 ml.) had been added, the tetrachloroethane was removed by steam distillation. 8-chlorotheopyhlline separated from the mixture as a cream-colored solid. It was filtered off and dried. The product weighed 52.6 g. and melted at 290° C. with decomposition. On standing overnight the filtrate deposited an additional 2.6 g. of product. It melted at 292° C. with decomposition. The total yield was 55.2 g. (86% of theory).

*Example 4*

A mixture of nitromethane (300 ml.), anhydrous theophylline (54 g.) and thionyl chloride (10 ml.) was heated to 70° C. and chlorine (23 g.) was added over a period of 32 minutes while the temperature was maintained at 65–70° C. Five minutes after addition of the chlorine was complete, diisobutylene (25 ml.) was added and the mixture was stirred for ten minutes. The nitromethane was removed by steam distillation, and the resulting crude 8-chlorotheophylline was filtered off and dried. It weighed 53.5 g. On standing overnight the filtrate deposited an additional 1.0 g. of product. The total yield (54.5 g.) was 84.4% of theory.

*Example 5*

A mixture of anhydrous theophylline (54 g., 0.3 mole), glacial acetic acid (300 ml.) and acetic anhydride (10 ml.) was heated to 60° C. All of the theophylline dissolved at this temperature. Chlorine (21 g., 0.3 mole) was then added over a period of 30 minutes while the temperature was kept at 59–66° C. When about 15 g. of chlorine had been introduced, a white crystalline material started to separate from the mixture. After all the chlorine was added, the mixture was cooled to 20° C., and the white solid was filtered off and dried. It weighed 44.5 g. It was a mixture of 8-chlorotheophylline with some other weakly acidic substance. A portion of this material (20 g.) was boiled for five minutes in 300 ml. of water, whereupon part of the material dissolved. The undissolved material was filtered off, thoroughly washed and dried. It weighed 5.1 g. and was shown to be 8-chlorotheophylline by its melting point (298° C. with decomposition), its neutralization equivalent (217–220) and microscopic examination of its mercury salt. The total quantity of 8-chlorotheophylline in the mixture was estimated to be about 11 g. (17% of theory).

*Example 6*

A mixture of anhydrous theophylline (54 g., 0.3 mole) and water (600 ml.) was heated to 70° C. Solution was still incomplete at this temperature. Chlorine (21 g., 0.3 mole) was added over a period of 25 minutes while the temperature was maintained at 69–77° C. By the time 2 g. of chlorine had been added, all of the theophylline had dissolved. After 7 g. of the chlorine had been added a white precipitate began to form. After all of the chlorine had been added, the mixture was heated to 90° C. and filtered. The solid was washed and dried. It was 8-chlorotheophylline as shown by its melting point (300° C. with decomposition), neutralization equivalent (217–219) and the microscopical properties of its mercury salt. The product weighed 12.6 g. (19.5% of theory).

In view of the above, it will be seen that the several objects of the invention are achieved and other advantageous results attained.

As many changes could be made in the above methods without departing from the scope of the invention, it is intended that all matter contained in the above description shall be interpreted as illustrative and not in a limiting sense.

We claim:

1. The method of forming 8-chlorotheophylline which comprises gradually introducing chlorine into a mixture of theophylline and a substantially inert reaction medium while maintaining the temperature less than approximately 80° C., the ratio of chlorine to theophylline being approximately equimolecular.

2. The method of forming 8-chlorotheophylline which comprises gradually introducing chlorine into a mixture of theophylline and a substantially anhydrous and inert reaction medium while maintaining the temperature less than approximately 80° C., the ratio of chlorine to theophylline being approximately equimolecular.

3. The method of forming 8-chlorotheophylline which comprises gradually introducing chlorine into a mixture of theophylline and a reaction medium while maintaining the temperature between approximately 60° and 80° C., the ratio of chlorine to theophylline being approximately equimolecular.

4. The method of forming 8-chlorotheophylline which comprises gradually introducing chlorine into a mixture of theophylline and a reaction medium while maintaining the temperature less than approximately 80° C., removing any free chlorine from the resulting reaction mixture, and isolating 8-chlorotheophylline therefrom, the ratio of chlorine to theophylline being approximately equimolecular.

5. The method of forming 8-chlorotheophylline which comprises gradually introducing chlorine into a mixture of theophylline and a reaction medium while maintaining the temperature between approximately 60° and 80° C., removing any free chlorine from the resulting reaction mixture, and isolating 8-chlorotheophylline therefrom, the ratio of chlorine to theophylline being approximately equimolecular.

6. The method of forming 8-chlorotheophylline which comprises gradually introducing chlorine into a mixture of theophylline and a substantially inert reaction medium while maintaining the temperature less than approximately 80° C., removing any free chlorine from the resulting reaction mixture, and isolating 8-chlorotheophylline therefrom, the ratio of chlorine to theophylline being approximately equimolecular.

7. The method of forming 8-chlorotheophylline which comprises gradually introducing chlorine into a mixture of theophylline and a substantially inert reaction medium, while maintaining the temperature between approximately 60° and 80° C., removing any free chlorine from the resulting reaction mixture, and isolating 8-chlorotheophylline therefrom, the ratio of chlorine to theophylline being approximately equimolecular.

8. The method of forming 8-chlorotheophylline which comprises gradually introducing chlorine into a mixture of theophylline and a substantially anhydrous and inert reaction medium while maintaining the temperature less than approximately 80° C., removing any free chlorine from the resulting reaction mixture, and isolating 8-chlorotheophylline therefrom, the ratio of chlorine to theophylline being approximately equimolecular.

9. The method of forming 8-chlorotheophylline which comprises gradually introducing chlorine into a mixture of theophylline and a substantially anhydrous and inert reaction medium while maintaining the temperature between approximately 60° and 80° C., removing any free chlorine from the resulting reaction mixture, and isolating 8-chlorotheophylline therefrom, the ratio of chlorine to theophylline being approximately equimolecular.

10. The method of forming 8-chlorotheophylline which comprises gradually introducing chlorine into a mixture of theophylline and nitrobenzene while maintaining the temperature between approximately 60° and 80° C., removing any free chlorine from the resulting reaction mixture, and isolating 8-chlorotheophylline therefrom, the ratio of chlorine to theophylline being approximately equimolecular.

11. The method of forming 8-chlorotheophylline which comprises gradually introducing chlorine into a mixture of theophylline and 1,2,2-tetrachloroethane, while maintaining the temperature between approximately 60° and 80° C., removing any free chlorine from the resulting reaction mixture, and isolating 8-chlorotheophylline therefrom, the ratio of chlorine to theophylline being approximately equimolecular.

12. The method of forming 8-chlorotheophylline which comprises gradually introducing chlorine into a mixture of theophylline and nitromethane while maintaining the temperature between approximately 60° and 80° C., removing any free chlorine from the resulting reaction mixture, and isolating 8-chlorotheophylline therefrom, the ratio of chlorine to theophylline being approximately equimolecular.

13. The method of forming 8-chlorotheophylline which comprises gradually introducing chlorine into a mixture of theophylline, glacial acetic acid and acetic anhydride while maintaining the temperature between approximately 60° and 80° C., removing any free chlorine from the resulting reaction mixture, and isolating 8-chlorotheophylline therefrom, the ratio of chlorine to theophylline being approximately equimolecular.

14. The method of forming 8-chlorotheophylline which comprises gradually introducing chlorine into a mixture of theophylline and water while maintaining the temperature between approximately 60° and 80° C., removing any free chlorine from the resulting reaction mixture, and isolating 8-chlorotheophylline therefrom, the ratio of chlorine to theophylline being approximately equimolecular.

AUGUST H. HOMEYER.
GEORGE B. DE LA MATER.

REFERENCES CITED

The following references are of record in the file of this patent:

Chemical Abstracts, 18, 3174[4], (1924) citing Yashitonmi, J. Pharm. Soc. Japan 508, 460–469 (1924).

Chemical Abstracts, 20, 587[5] (1926), citing Yashitonmi, J. Pharm. Soc. Japan, 525, 884–888 (1925).